March 23, 1965   J. H. HOEKSEMA   3,174,266
MULTI-ROW CORN HARVESTER ATTACHMENT
Original Filed May 19, 1960   7 Sheets-Sheet 1

INVENTOR.
J. H. HOEKSEMA
ATTORNEYS

March 23, 1965

J. H. HOEKSEMA 3,174,266

MULTI-ROW CORN HARVESTER ATTACHMENT

Original Filed May 19, 1960

INVENTOR.
J.H. HOEKSEMA

BY
ATTORNEYS

March 23, 1965    J. H. HOEKSEMA    3,174,266
MULTI-ROW CORN HARVESTER ATTACHMENT
Original Filed May 19, 1960    7 Sheets-Sheet 3

INVENTOR.
J.H. HOEKSEMA
BY
ATTORNEYS

March 23, 1965    J. H. HOEKSEMA    3,174,266
MULTI-ROW CORN HARVESTER ATTACHMENT
Original Filed May 19, 1960    7 Sheets-Sheet 5

INVENTOR.
J. H. HOEKSEMA

ATTORNEYS

INVENTOR.
J. H. HOEKSEMA

ATTORNEYS

March 23, 1965 J. H. HOEKSEMA 3,174,266
MULTI-ROW CORN HARVESTER ATTACHMENT
Original Filed May 19, 1960 7 Sheets-Sheet 7

*INVENTOR.*
J. H. HOEKSEMA

ATTORNEYS ns. (Cl. 56—18)

United States Patent Office 3,174,266
Patented Mar. 23, 1965

3,174,266
MULTI-ROW CORN HARVESTER ATTACHMENT
Joe H. Hoeksema, Des Moines, Iowa, assignor to Deere &
Company, Moline, Ill., a corporation of Delaware
Continuation of application Ser. No. 30,283, May 19,
1960. This application Dec. 2, 1963, Ser. No. 328,785
10 Claims. (Cl. 56—18)

This invention relates to a corn harvesting implement and more particularly to a corn harvester attachment for use with the conventional type combine. In U.S. Patent 2,794,307 issued June 4, 1957 to Messrs. C. S. Morrison, H. H. Denison, and F. D Jones, there is therein shown a forwardly extending two-row corn harvester attachment which may be mounted on the forward end and in place of the harvester reel of the conventional type combine. Since the issuance of this patent it has become common throughout the farm implement industry to provide a corn harvester attachment either of the type shown in the patent or one similar in principle to that shown.

This is a continuation of application Ser. No. 30,283, filed May 19, 1960, now abandoned.

While it is recognized that considerable merit lies in the principles taught and described in the aforesaid patent, it should also be recognized that there are some shortcomings, one of the primary being that in many instances, and particularly when used with a larger type combine, the full capacity of the combine is not utilized by harvesting only two rows of corn. Consequently it is the main object of the present invention to provide a corn harvester attachment for use with a combine which fully utilizes the entire capacity of the combine by providing a harvesting mechanism which will simultaneously harvest four or more rows of corn as the combine advances over the field.

More specifically it is the object of the present invention to provide mounting structure supported on the combine and disposed forwardly of the combine on which at least two two-row corn harvester attachments may be mounted. The two-row units individually are somewhat similar in nature to that shown in the aforementioned Morrison et al. patent and the units are mounted on the forward structure so that each two-row unit may be moved vertically independently of the other.

It is proposed to support a transverse tubular beam with an outer cylindrical surface forward of the combine and extending outwardly of the front wheels of the combine. The individual two-row units are mounted on the transverse beam by means of trunnions which will permit the row units to be raised or lowered. Hydraulic cylinders will extend from the combine to each two-row unit and may operate to raise and lower the units independently of one another.

It is further proposed and is an object of the present invention to provide a unique arrangement of conveyors which includes a centrally located forwardly extending auger conveyor extending from the crop inlet of the combine to a forward and beneath and forward of the transverse beam. The central conveyor is held against movement. Each of the two-row crop units has a fore-and-aft extending conveyor which moves the harvested crops rearwardly and each two-row crop unit is provided with a rear transversely disposed auger conveyor which feeds into the inlet end of the central auger conveyor of the combine. Junctures are provided between the inner ends of the transverse conveyors and the intake forward end of the central conveyor so that the two two-row crop units may be moved relative to the central conveyor without effecting or stopping the movement of crops. Also, each juncture is such as to accommodate relative movement between the respective transverse conveyor and the central conveyor.

As a further improvement and an object of the present invention, it is proposed to provide doors or panels adjacent the junctures between the central conveyor and transverse conveyors which are biasedly held in closed positions but will yield to discharge crops should either the transverse or central conveyor become clogged.

Other objects and advantages of the present invention will become apparent to those skilled in the art as the nature of the invention is better understood from the following description and as shown in the accompanying drawings.

Figure 1:
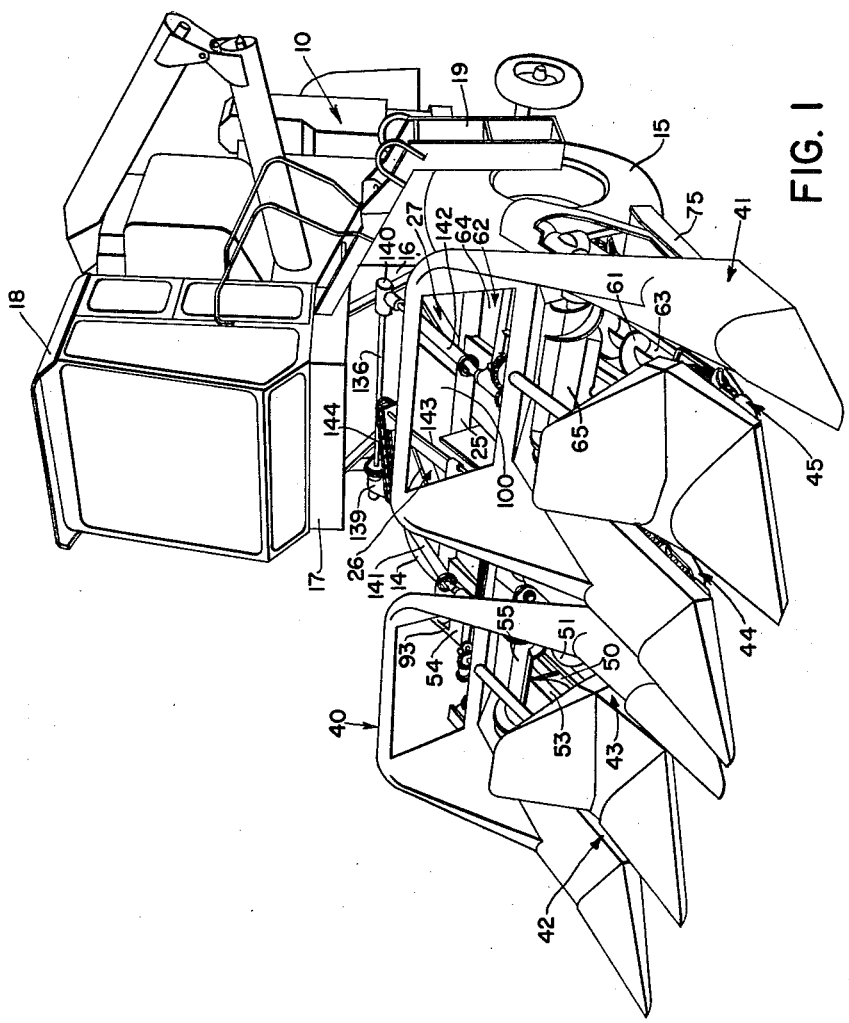
FIG. 1 is a front and side perspective view of the corn harvester attachment and the combine.
Figure 2:
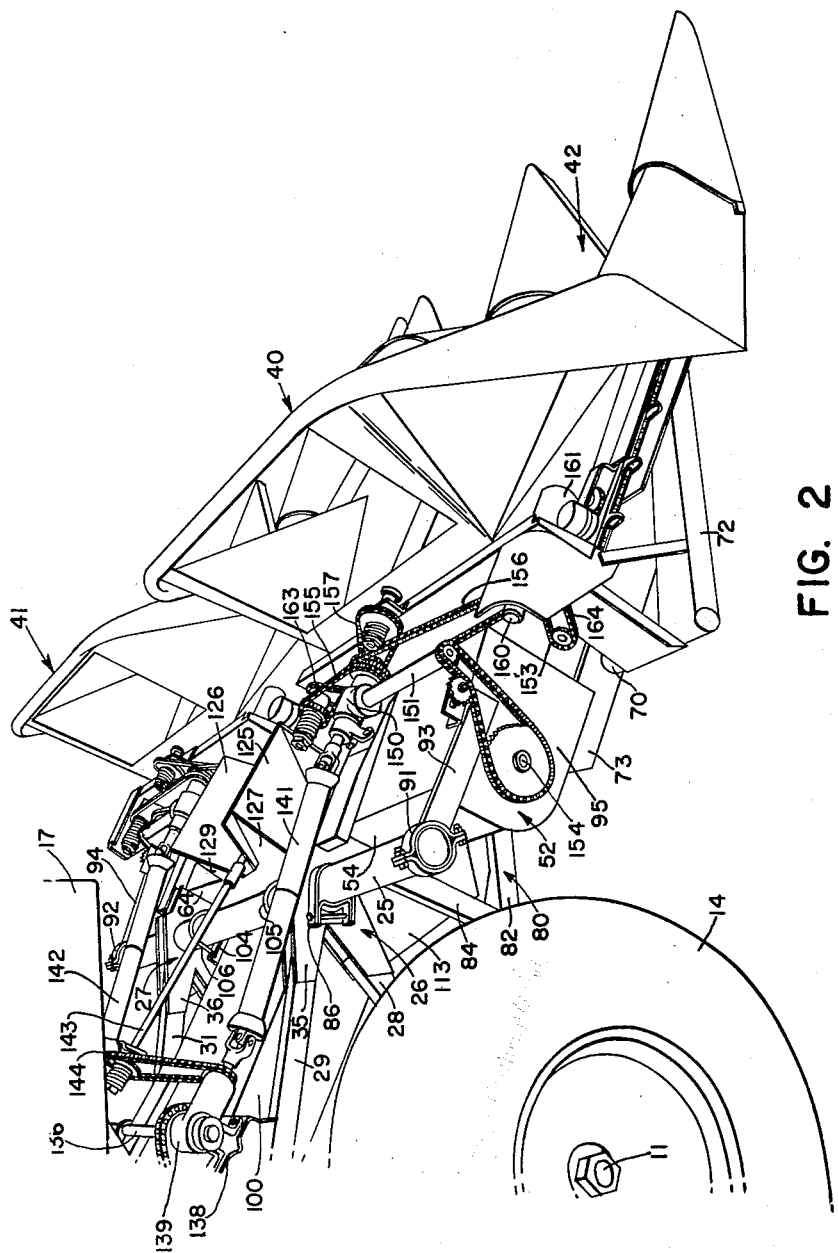
FIG. 2 is a side perspective view of the forward portion of the combine and the corn harvester attachment.
Figure 3:
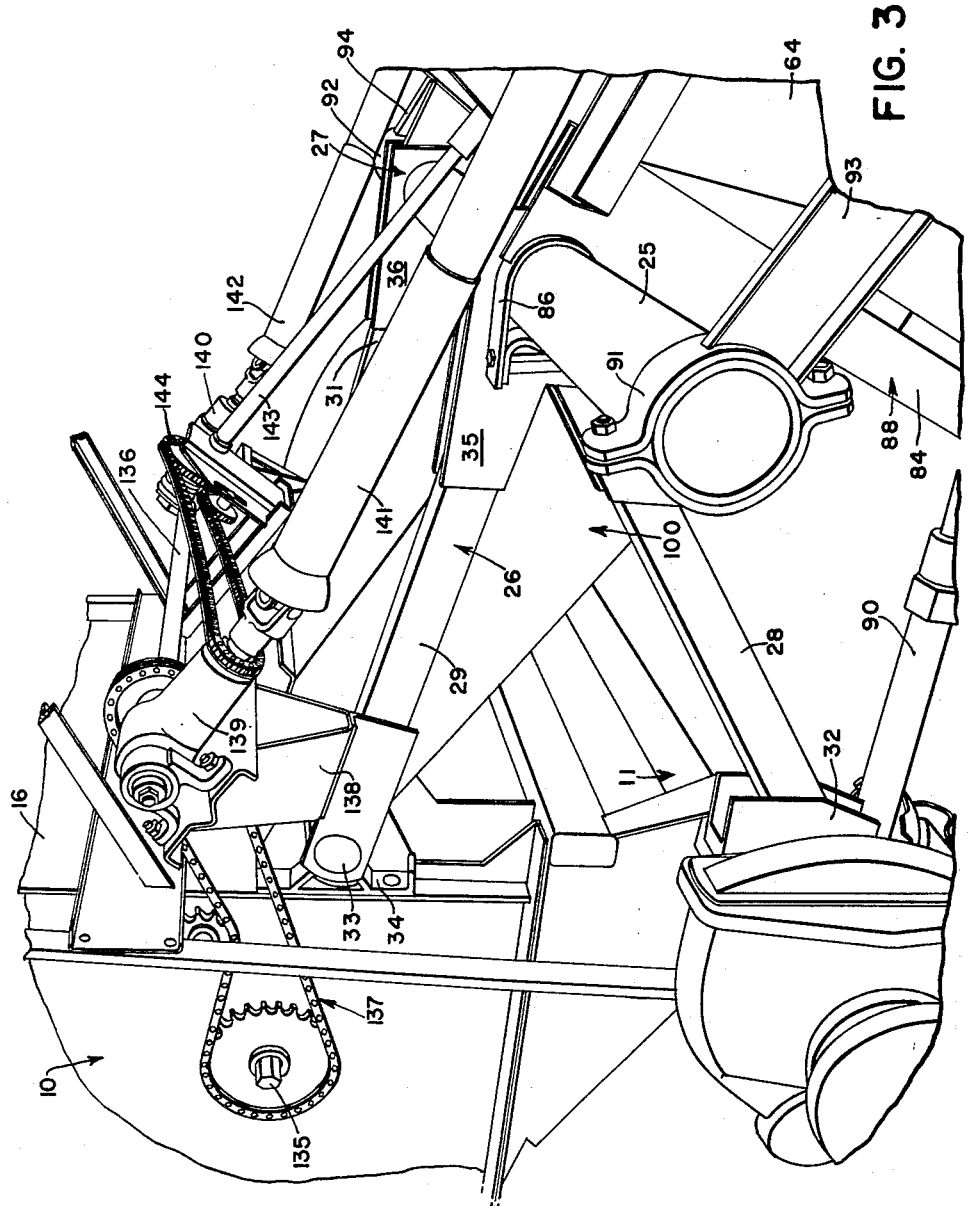
FIG. 3 is a side perspective view of the forward portion of the combine and the rear portions of the corn harvester attachment looking rearwardly at the forward end of the combine.
Figure 4:
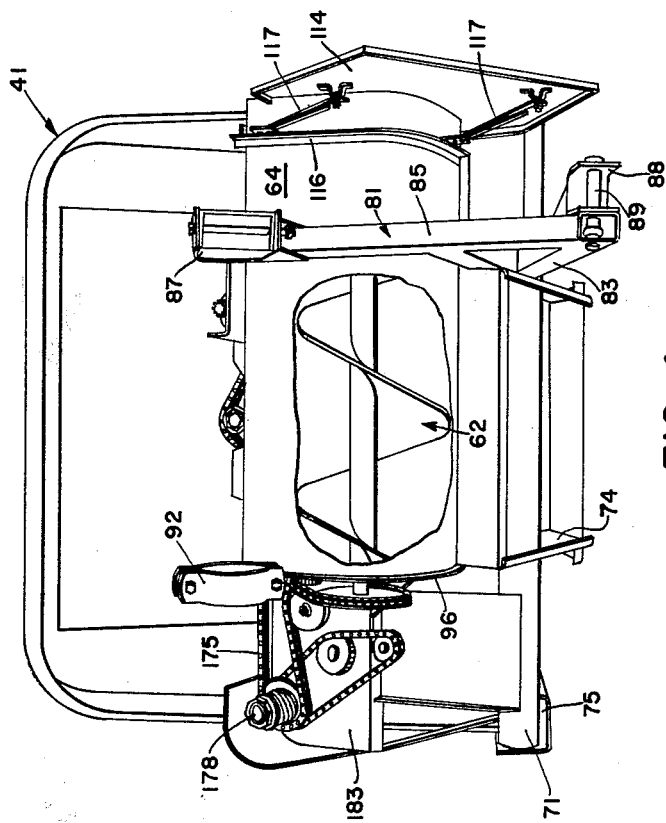
FIG. 4 is a rear perspective view of a portion of the corn harvester attachment in detached relation to the combine and with portions removed to show internal mechanism.
Figure 5:
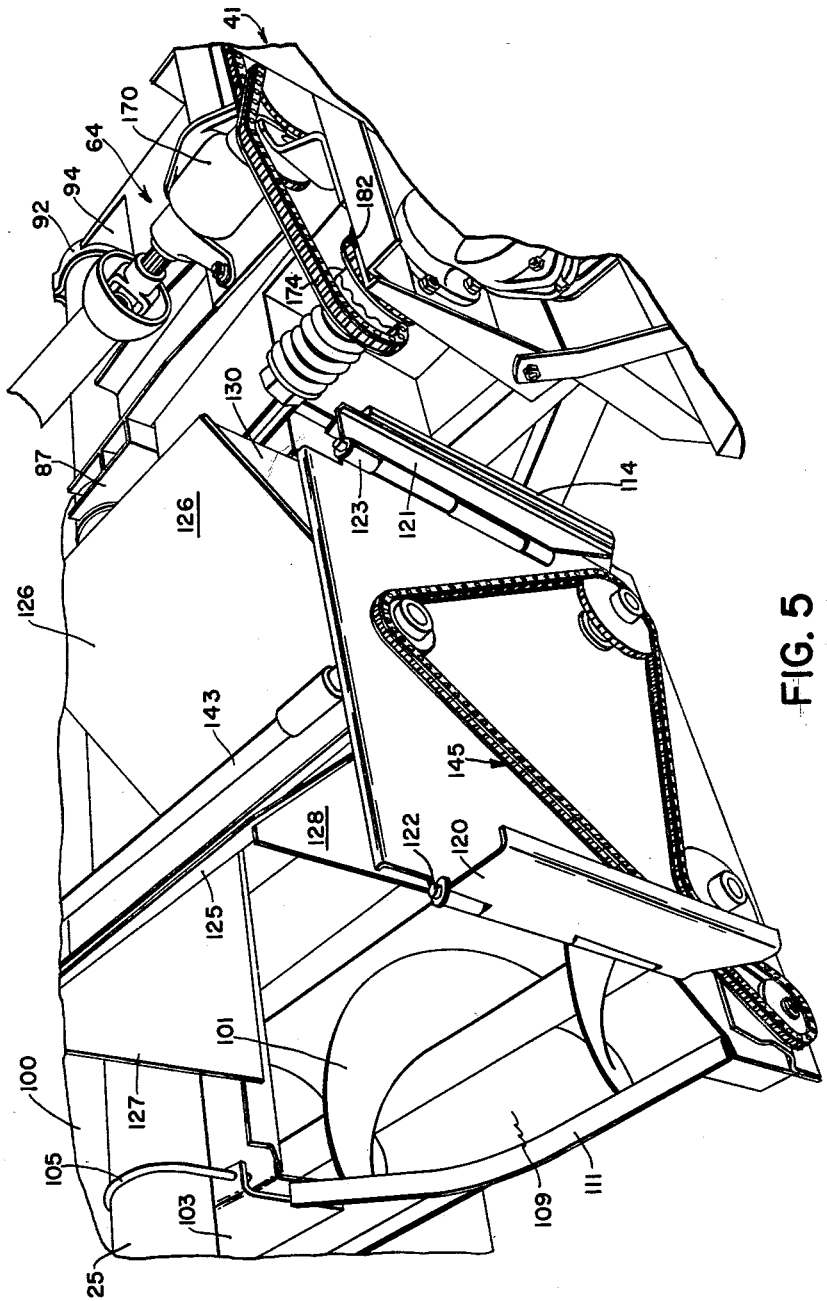
FIG. 5 is a front perspective view looking downwardly on the corn harvester attachment with one of the two-row harvesters removed for purpose of clarity.

Referring now to FIG. 1, there is provided a main mobile frame composed of a fore-and-aft extending elongated combine body 10 supported at its forward end by a transverse axle structure 11. The transverse axle structure 11 has right- and left-hand carrying or traction wheels 14, 15 respectively at opposite ends thereof to carry the machine forwardly over the row planted corn field with the longitudinal center line of the combine body 10 being centered between a pair of adjacent rows of corn. Since the present structure pertains to a multi-row corn harvester unit, it may be said that the fore-and-aft center line of the combine body runs centrally between the rows of corn to be harvested on the right side of the harvester and on the left side of the harvester. The wheels 14, 15 are disposed to run between pairs of rows to the right and left respectively of the fore-and-aft center line of the combine body 10. Consequently relative to each of the wheels 14, 15 there will be a row of plants of corn closely inboard and outboard respectively of the wheel. The combine body 10 has a forwardly opening crop inlet, not shown, but clearly evident by surrounding structure, in a front upright panel 16 of the combine. The main body 10 also supports a platform 17 on which is located an operator's station enclosed by an enclosure 18 that may be reached by means of a ladder 19. The combine also has a hydraulic system of the conventional type which may be utilized for various functions such as power raising and lowering the harvesting units.

The supporting frame for the harvesting units is composed primarily of a forwardly disposed transverse tubular beam 25 extending across the width of the combine with opposite ends thereof positioned forwardly of the traction wheels 14, 15. The tubular beam 25 is round in cross-section to provide both strength and a trunnion outer surface for supporting the individual row-crop units. The tubular beam 25 is supported from the forward end of the combine by means of a pair of transversely spaced apart supports 26, 27. The main supports 26, 27 are composed of forwardly converging trusses 28, 29 and 30, 31 respectively. The trusses 28, 30 extend upwardly and forwardly from bracket structure such as at 32 which is fixed to the axle structure 11. The trusses 29, 31 extend forwardly and slightly downwardly from rear connections, as at 33, which are detachably connected to forwardly projecting brackets 34 fixed to the forward face of the combine wall 16. In this respect, it should be recognized that the combine body is of the relatively large type and the plate 16 is suitably reinforced by framework, not shown, sufficiently adequate to support considerable weight at its forward end. As previously mentioned the truss members 29, 28 and truss members 30, 31 converge at their forward end and are joined by gusset structures 35, 36 which have transversely alined openings to receive the transverse shaft 25. The transverse beam 25 is rigidly held in the gusset structures 35, 36 by means of U-bolts 37, 38 respectively which extend through the forward face or edge of the gusset structures 35, 36 and around the beam 25.

A pair of two-row corn harvesters 40, 41 are positioned forwardly of the transverse beam 25. The right-hand two-row unit 40 is positioned to the right of the fore-and-aft center line of the combine body 10 and has forwardly extending harvesting and gathering structures, indicated in their entirety by the reference numerals 42, 43, which gather and harvest the adjacent pair of row of crops to the right of the fore-and-aft center line. The left-hand two-row harvester 41 has forwardly extending gathering and harvesting structures 44, 45 which gather and harvest crops of the pair of rows to the left of the fore-and-aft center line of the combine body. As previously mentioned, the traction wheels 14, 15 run between the pair of rows to the right and to the left of the fore-and-aft center line and consequently the two-row unit 40 will harvest the rows of crops inboard and outboard respectively of the wheel 14 and the two-row unit 41 will harvest the rows of crops inboard and outboard respectively of the wheel 15.

The right-hand two-row unit 40 is provided with a fore-and-aft extending crop conveyor in the form of a pair of parallel fore-and-aft extending augers 50, 51 which receive harvested crops from the harvesting and gathering structure 42, 43 and feeds the crops rearwardly to the forward side of a transverse auger conveyor 52. The auger conveyors 50, 51 and conveyor 52 are provided with a conventional type auger trough or conveyor housnig 53, 54 respectively, having forwardly opening sides receiving material from the augers. A transverse trash clearing and beater mechanism 55 is provided adjacent the upper or rear ends of the gathering and harvesting structures 42, 43 and operate to move both trash and harvested crops inwardly to the fore-and-aft auger conveyors 50, 51.

A similar arrangement of conveying mechanism is provided for the left-hand two-row harvesting unit 41 in that there is provided a pair of fore-and-aft extending auger conveyors 60, 61 which receive the material from the gathering and harvesting structures 44, 45 and feeds the harvested crop rearwardly to the forward side of a transverse auger conveyor 62. Suitable auger troughs or conveyor housings 63, 64 are provided for the augers 60, 61 and 62, respectively. A transverse trash clearing and beater mechanism 65 is also provided to move both trash and harvested crops from the harvesting mechanisms 44, 45 inwardly to the fore-and-aft extending auger conveyors 60, 61.

Since the harvester units 42, 43 are disposed to harvest rows of corn inboard and outboard of the traction wheel 14 and the harvesting units 44, 45 are disposed to harvest rows of corn inboard and outboard on the traction wheel 15, it follows that the troughs 53, 63 and the respective fore-and-aft extending auger conveyors contained therein are generally in fore-and-aft alinement with the respective traction wheels 14, 15. The description of the two-row harvesting units 40, 41 has been only generally set forth. However, it is believed that such is adequate although details of the unit may be had by referring to the aforementioned Morrison et al. patent and also to U.S. Patent 2,946,170 of Sidney E. Anderson which shows a more advanced model of two-row unit and also U.S. Patent 3,091,070 of James D. Wilkins and Frank D. Jones which shows details of the transverse trash removers 55, 65.

Referring specifically to FIGS. 1–4, the two-row crop units are provided with a transverse tubular beam 70, 71 respectively which fit under and forward of the respective transverse auger conveyors 52, 62. Fore-and-aft extending supporting beams or channels such as at 72, 73, and 74, 75, project rigidly from the beam 70, 71 and support from underneath the harvesting units 40, 41. Generally details of the supporting structure for the individual row-units 40, 41 are shown and described in the aforementioned Morrison et al. patent and if further details are desired, such may be had by reference to that patent.

A pair of L-shaped uprightly disposed channel beams 80, 81 have forwardly extending horizontal leg portions 82, 83 rigidly fixed to the transverse beams 70, 71 respectively and have upwardly extending leg portions 84, 85 disposed behind the transverse conveyors 52, 62. The upper end of the leg portions 84, 85 support trunnion type clamps 86, 87 adapted for connection to the transverse beam 25. The lower end of the vertical leg portions 84, 85 support brackets such as is shown at 88 (FIG. 4) having pivotal connections 89 for connecting the forward end of a hydraulic cylinder or power unit such as is shown at 90 (FIG. 3) extending between the pivot pin 89 and the bracket, such as at 32, on the axle structure 11 of the combine. Consequently by extending or retracting the hydraulic cylinders, such as at 90, the harvesting units 40, 41 may be independently controlled to pivot on their trunnions 86, 87 respectively and to be raised and lowered selectively. Further supporting the units 40, 41 on the transverse beam 25 are outer trunnion clamps 91, 92 which fit over opposite ends of the beam 25, and are mounted on rearwardly projecting arms 93, 94 respectively fixed to end plates 95, 96 of the transverse auger housing 54, 64 respectively.

Figure 6:
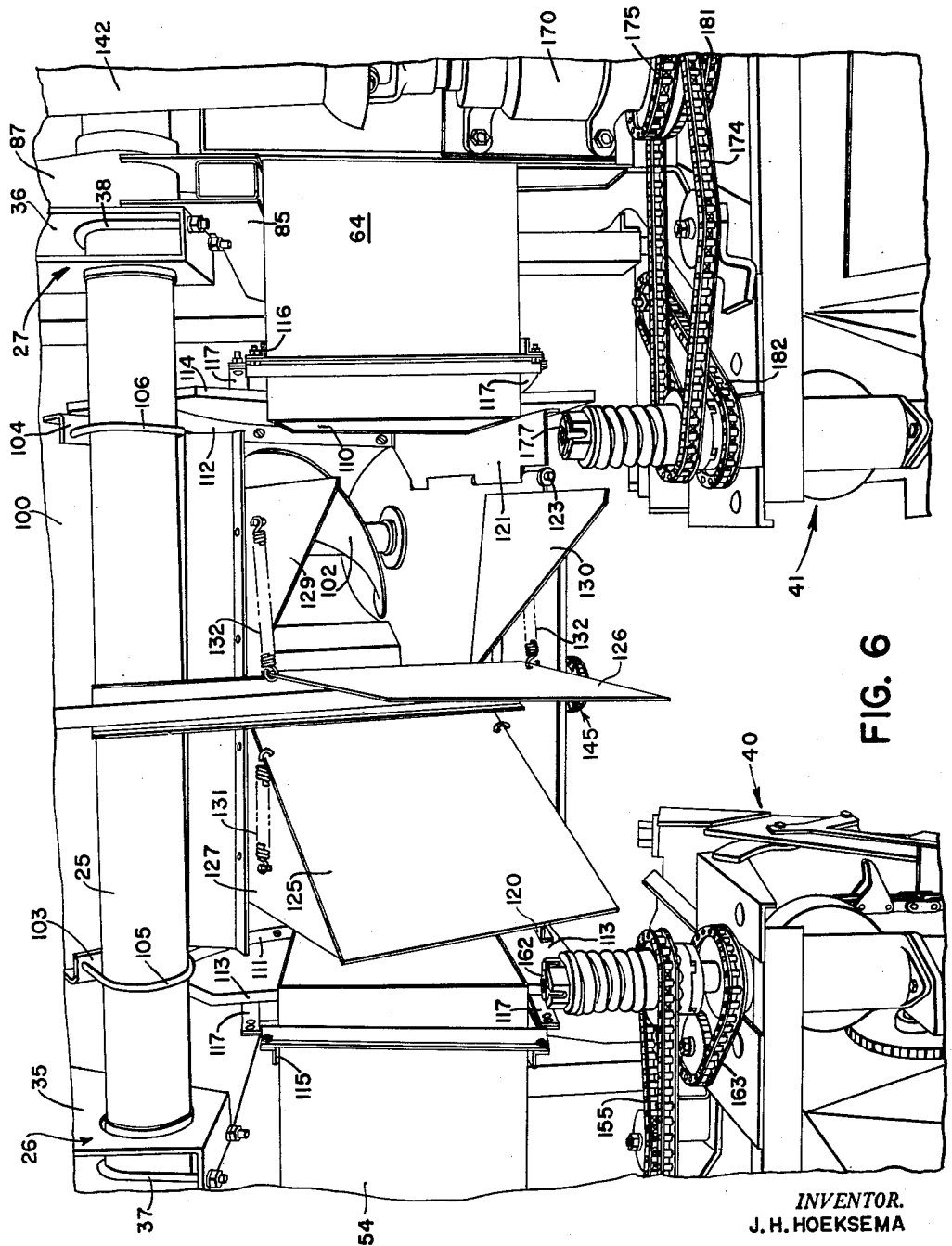
FIG. 6 is a plan perspective view looking downwardly at the rear portion of the corn harvester attachment.

A centrally located and fore-and-aft extending auger or conveyor housing 100 projects forwardly and downwardly from the crop inlet in the front wall 16 of the combine. The auger housing 100 carries within and completely encloses a pair of fore-and-aft extending augers 101, 102. The auger housing 100 projects to a forward end beneath and forward of the transverse beam 25 and is fixed to the beam 25 by means of L-shaped brackets or pads 103, 104 welded or otherwise fixed to the sides of the housing 100 and connected directly to the beam 25 by means of U-shaped bolts 105, 106. Generally, therefore, the housing 100 is held against movement. The forward end of the housing 100 is provided with side inlets or openings 109, 110. The openings 109, 110 generally include laterally extending arcuate flanges 111, 112 which receive the lower curved or trough portions of the transverse auger housings 54, 64 respectively. As may be seen from viewing FIG. 6 the transverse auger housings 54, 64 generally telescope transversely into the side openings 109, 110, the housings 54, 64 being considerably smaller than the openings.

The juncture between the inner ends of the transverse conveyor housings 54, 64 and the openings 109, 110 includes upright fore-and-aft extending plates 113, 114, each having an adjoining edge formed about the outside periphery of the respective auger housings 54, 64 and extending outwardly therefrom. The plates 113, 114 are supported on the housings 54, 64 by means of U-shaped angle iron brackets 115, 116 fixed to the outside surface of the auger housings 54, 64 and carrying leaf springs, as at 117, which bias the plates 113, 114 toward the inner ends of the respective auger housings 54, 64. As may be seen from viewing FIG. 6, there are gaps between the outside peripheral surfaces of the auger housings 54, 64 and the flanges 111, 112. The plates 113, 114 fill these gaps and generally ride against the outer faces of the central auger housing 100. The springs 117 normally bias the plates 113, 114 in a closed relation with the housing 100 so as to prevent leakage of material from the conveyor housing. However, should a sufficient overload occur the plates will yield. Also, the plates 113, 114 are in sliding engagement with the housing 100 and the transverse housings 54, 64 may be moved relative to the central housing without effecting the complete closure of the junctures between the housings 54, 64 and 100.

The forward end of the central housing 100 is provided with a pair of oppositely disposed panels 120, 121 normally biased to close the forward end of the housing by spring hinges as at 122, 123. The edges of the panels 120, 121 are flanged and normally engage the surfaces of the plates 113, 114 respectively. The plates 120, 121, will yield forwardly to permit the inner ends of the conveyor housings 54, 64 to be received in the openings 109, 110 when the row units 40, 41 are being mounted on the shaft 25. Therefore, from the above described junctures between the inner ends of the transverse auger housings 54, 64 and the openings at the side of the central conveyor housing 100, it should be recognized that there is a degree of articulation provided to accommodate the raising and lowering of either of the crop harvesting units 40, 41 as well as relative movement between the units 40, 41 and the housing 100.

Directly over the lower ends of the augers 101, 102 and generally in the area of the side openings 109, 110 there is provided on the housing 100 a pair of upwardly yielding doors 125, 126 pivotally mounted on fore-and-aft extending axes to swing vertically. Normally the doors 125, 126 rest on upper edges of triangular shaped upright panels or plates 127, 128, and 129, 130 so that the panels or doors 125, 126 will be inclined and be generally in alinement with the transverse auger housings 54, 64. The doors are yieldably held in the down or closed position by means of springs 131, 132 respectively. The purpose of the doors 125, 126 is to provide access to the augers particularly should clogging occur at the juncture between the transverse conveyors 52, 62 and the fore-and-aft extending central conveyors 101, 102 or in the central conveyor housing 100. Also, should clogging occur and should the area beneath the doors 125, 126 become clogged, the doors 125, 126 will be urged upwardly and the accumulation of harvested crop will pass through the openings left by the doors. As may be seen from viewing FIG. 1, the doors 126, 125 are in view of the operator's platform 17 and the operator will immediately become aware of the latter occurance and will shut down the machine until the clogging is relieved.

Figure 7:
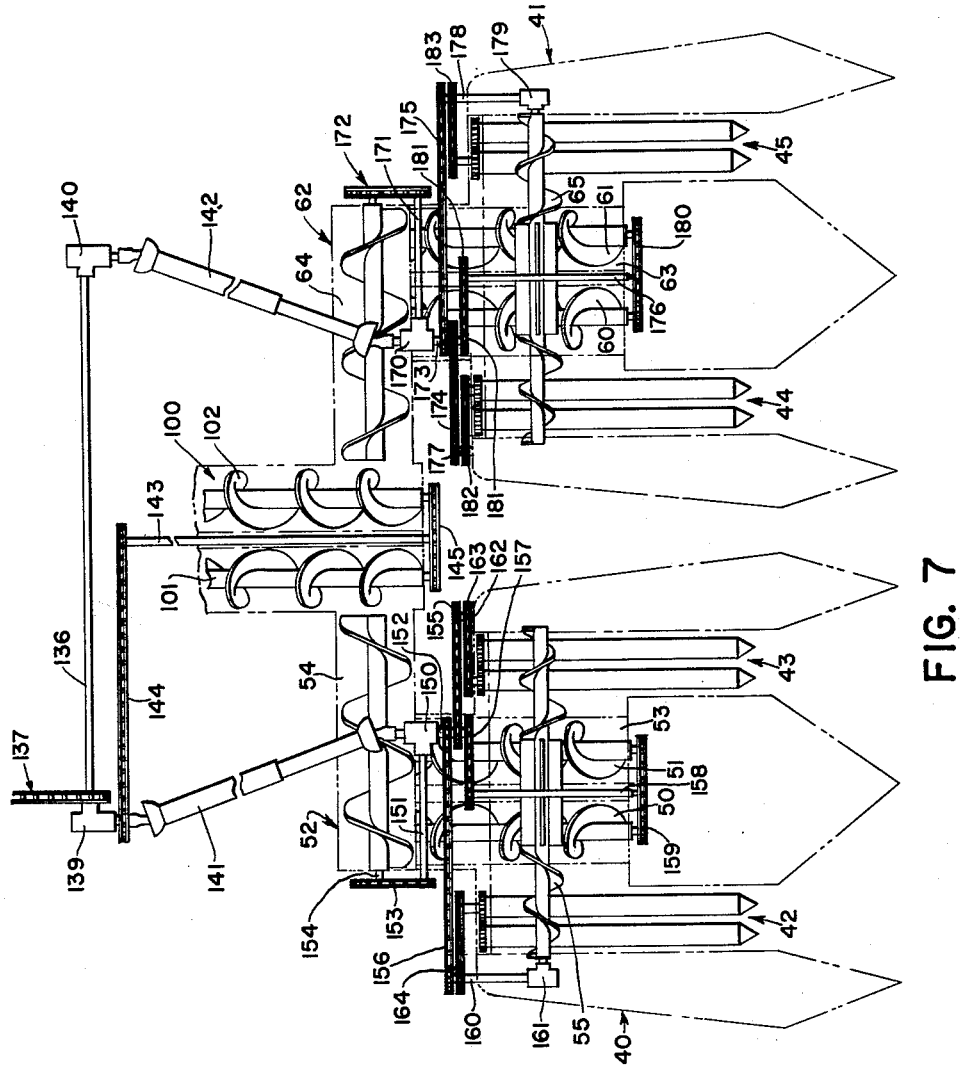
FIG. 7 is a schematic view showing the power train and conveying system of the corn harvester attachment.

Viewing the schematic view of the various mechanisms shown in FIG. 7, it becomes apparent that the forward harvesting structure 42, 43, 44, 45 will operate to harvest corn from four adjacent rows of corn and to feed the corn to the fore-and-aft extending augers 50, 51 and 60, 61 to be discharged in the transverse conveyors 52, 62 respectively. The transverse conveyors 52, 62 drive the material inwardly to the central auger conveyors 101, 102 which feed the material into the crop inlet on the forward end of the combine.

The power for operating the entire harvester attachment is received directly from the combine and through a main transverse drive shaft 135. The shaft 135 is drivingly connected to a transverse counterdrive shaft 136 by means of a chain drive indicated in its entirely by the reference numeral 137. The transverse shaft 136 extends across the upper end of the harvester attachment and is mounted on the truss members 29, 31 by brackets, one of which is shown at 138, the latter brackets also serving to support transmissions 139, 140 which transmit power from opposite ends of the shaft 136 to forwardly extending telescopic drive shaft assemblies 141, 142. The right-hand transmission 139 operates a transverse chain drive 144 extending inwardly to a central fore-and-aft extending drive shaft 143 mounted on the upper surface and extending the length of the central auger housing 100. The forward end of the shaft 143 is provided with a suitable chain drive, indicated in its entirety by the reference numeral 145, which extends over sprockets carried on the forward ends of the drive shafts for the augers 101, 102. Suitable reversing sprockets are provided in the chain drive 145 to operate the augers 101, 102 in the correct direction of rotation.

A gear transmission 150 is provided on the forward end of the telescopic drive assembly 141 and has extending therefrom a transverse drive shaft 151 and a fore-and-aft extending drive shaft 152. The outer end of the transverse drive shaft carries a chain drive 153 which includes a sprocket mounted on a transverse auger drive shaft 154 of the transverse auger conveyor 52. The fore-and-aft extending drive shaft 152 is provided with a first chain drive 155 which drives a fore-and-aft extending shaft 162. The shaft 162 drives a chain drive 163 which drives the harvesting mechanism 43. A second transverse chain drive 156 extends to an outer fore-and-aft shaft 160, the forward end of which has a transmission 161 which drives the trash remover 55. A chain drive 164 extends from shaft 160 inwardly to operate the outer harvesting mechanism 42. A third chain drive 157 extends from the shaft 152 to a fore-and-aft extending shaft 158 which projects forwardly to the forward end of the auger trough 53. The forward end of the shaft 158 is provided with a suitable chain drive 159 extending outwardly to drive the augers 50, 51.

The drive mechanism for the left-hand harvesting unit 41 is substantially similar to that of the right-hand unit 40 and includes a transmission 170 connected to the forward end of the telescopic drive mechanism 142 which operates the transverse auger of the auger conveyor 62 by means of a transverse shaft 171 and a chain drive 172. Likewise, inner and outer fore-and-aft drive shafts 177, 178 are driven from a forwardly extending drive shaft 173 of the transmission 170 by means of transverse chain drives 174, 175 respectively. The shaft 178 has at its forward end a transmission 179 which is connected to and operates the transverse trash remover 65. A drive shaft 176 for the fore-and-aft extending augers 60, 61 is also driven from the shaft 173 by means of a chain drive 181, the auger drive shaft 176 also being connected to the individual augers 60, 61 by means of a chain drive 180. The harvesting mechanisms 44, 45 are driven from the inner and outer fore-and-aft shafts 177, 178 by means of chain drives 182, 183.

Generally it should be recognized that throughout the drive mechanism there are provided suitable overrunning clutch and release mechanisms which will provide satisfactory safeguards for all operating mechanisms. Also, the drive mechanism herein described is not complete but is limited to that considered necessary for a full appreciation of the invention.

While the present invention was shown and described in detail, it was done so for the purpose of clearly and concisely illustrating the principles of the invention and it was not intended to limit or narrow the invention beyond what is specifically claimed. It should be understood that the purposes of so describing the structure were for clarification and complete understanding of the principles taught and were not intended to limit or narrow the invention beyond the broad concepts set forth in the appended claims.

What is claimed is:

1. A corn picker attachment for a combine having transversely spaced forward traction wheels and a centrally located forwardly opening crop inlet, comprising: a transverse beam supported on the combine spacedly forward of the combine with opposite ends thereof forward of the respective wheels, said beam being disposed spacedly above the ground; a fore-and-aft extending central auger trough with auger means therein having a rear discharge opening into the crop inlet and extending forwardly to an intake end forwardly of the transverse beam, said intake end having oppositely disposed side openings for receiving crops; means rigidly supporting the central auger trough on the transverse beam against movement; a pair of forwardly extending multi-row crop units forward of the respective traction wheels, and having forward gathering and harvesting structure on opposite sides of the respective wheels, each of the crop units having a fore-and-aft extending crop conveyor generally in fore-and-aft alinement with the respective traction wheel for feeding harvested crops rearwardly and a transverse conveyor including a conveyor trough substantially in alinement and in registry with a side opening of the central conveyor and extending thereto from an intake end disposed to receive crops from the fore-and-aft extending crop conveyor; means mounting each of the crop units on the transverse beam for independent raising and lowering of the units; power means between the combine and crop units for selectively raising and lowering the units and for movement relative to the central housing; and a pair of material retaining junctures between the transverse conveyor troughs and the respective side openings of the central auger trough, said junctures being adaptable to accommodate relative vertical movement of the transverse conveyors while retaining a seal against the loss of material.

2. A corn picker attachment for a combine having transversely spaced forward traction wheels and a centrally located forwardly opening crop inlet, comprising: a transverse beam supported on the combine forward of the wheels; a fore-and-aft extending central auger trough with auger means therein having a rear discharge opening into the crop inlet and extending forwardly therefrom beneath the transverse beam to an intake end forwardly of the transverse beam, said intake end having oppositely disposed side openings for receiving crops; means supporting the central auger trough on the transverse beam against movement; a pair of transversely spaced forwardly extending multi-row crop units forward of the transverse beam, each having a pair of forward gathering and harvesting structures for harvesting crops on opposite sides of the respective wheels, each of the crop units having a fore-and-aft extending crop conveyor between the pair of forward gathering and harvesting structures generally in fore-and-aft alinement with the respective traction wheel for feeding harvested crops rearwardly and a transverse conveyor substantially in alinement and in registry with a side opening of the central conveyor and extending thereto from an outer intake end disposed to receive crops from the fore-and-aft extending crop conveyor; means mounting the crop units on the transverse beam for vertical movement and for movement relative to the central trough; power means between the combine and crop units for selectively raising and lowering the units; and a pair of material retaining junctures between the transverse conveyor troughs and the respective side openings of the central auger trough, said junctures being adaptable to accommodate relative vertical movement between the central auger trough and the transverse conveyor while retaining a material seal.

3. A corn picker attachment for a combine having transversely spaced forward traction wheels and a centrally located forwardly opening crop inlet, comprising: a transverse beam supported on the combine forward of the wheels; a fore-and-aft extending central auger trough with auger means therein having a rear discharge opening into the crop inlet and extending forwardly therefrom to an intake end forwardly of the transverse beam, said intake end having oppositely disposed side openings for receiving crops; means supporting the central auger trough on the transverse beam against movement; transversely spaced forwardly extending multi-row crop unit forward of the transverse beam including pairs of forward gathering and harvesting structures for harvesting crops on opposite sides of each of the respective wheels fore-and-aft extending crop conveying means for feeding harvested crops upwardly and rearwardly, and a transverse conveyor including a conveyor trough substantially in alinement and in registry with a side opening of the central conveyor and extending therefrom to an outer end, the conveyor trough being disposed to receive crops from the fore-and-aft extending crop conveying means; means mounting the crop units on the transverse beam for vertical movement and for movement relative to the central auger trough; and power means between the combine and crop units for selectively raising and lowering the units.

4. The invention defined in claim 3 in which the transverse beam is a tubular structure having an outer cylindrical surface and the means mounting the row units on the beam is arms journaled on the cylindrical surface and connected to the respective row units.

5. The invention defined in claim 3 in which the transverse conveyors are augers supported in transverse auger troughs, and further characterized by junctures joining the inner ends of the transverse auger troughs with the side openings of the central auger trough, each of said junctures including an upright fore-and-aft extending plate adjacent and extending outwardly from the inner end of the respective transverse auger trough and slidably engaged with the central auger trough to effect a closed juncture while accommodating relative movement between the respective transverse auger trough and the central auger trough.

6. The invention defined in claim 3 in which the transverse conveyors have transverse troughs extending to the side openings of said central auger trough, and further characterized by junctures between the transverse troughs and the central trough and yieldable wall structure adjacent the junctures in the walls of the troughs which will yield upon overload in the respective conveyors to emit crops, and biasing means connecting the yieldable walls to the troughs for maintaining the yieldable walls in a closed position.

7. A corn picker attachment for a combine having transversely spaced forward traction wheels and a centrally located forwardly opening crop inlet, comprising: a transverse beam supported on the combine forward of the respective wheels; a fore-and-aft extending central conveyor trough with a conveyor therein having a rear discharge opening into the crop inlet and extending forwardly therefrom to an intake end forwardly of the transverse beam, said intake end having intake openings on opposite sides for receiving crops; means supporting the central conveyor trough on the transverse beam; forwardly extending multi-row crop units forward of the respective traction wheels, and having forward gathering and harvesting structure inboard and outboard respectively of the traction wheels, the crop units having transversely spaced fore-and-aft extending crop convoys for feeding harvested crops rearwardly; alined transverse conveyors substantially in alinement and in registry with the intake opening of the central conveyor and extending thereto from outer ends, the transverse conveyors being disposed behind and adapted to receive crops from the fore-and-aft extending crop conveyors; transverse beater means overlying the fore-and-aft conveyors and disposed forwardly of and adjacent the transverse conveyors cooperative with the fore-and-aft conveyors for moving crops into the transverse conveyors; means mounting the crop units on and forwardly of the transverse beam; and power means between the combine and crop units for raising and lowering the units.

8. A corn harvester attachment for use with a combine in a field in which corn is planted in conventional parallel rows spaced uniformly apart, and the combine has a longitudinal mobile body with a forwardly opening crop inlet, a forward transverse axle structure and right- and left-hand forward traction wheels at opposite ends of the axle structure, the longitudinal center line of the body being centered between adjacent right- and left-hand pairs of rows, said attachment comprising: a conveyor housing structure including a centrally located forwardly projecting conveyor housing section adapted at its rear end for connection to the combine and opening, when attached thereto, into the crop inlet, the housing structure further including a pair of outwardly projecting auger troughs extending from the forward end of the central conveyor housing forwardly of the respective wheels to outer ends; material conveyor means in the housing structure for moving material from the front to the rear of the central housing and a pair of augers for moving materials in the troughs to the central housing; forwardly and downwardly projecting harvesting structure immediately adjacent to and rigid with the forward sides of the auger troughs and including on each side of the aforesaid fore-and-aft center line at least two row harvesting units for detaching ears from the corn stalks of the respective pair of rows on the respective sides of the center line and further including elevating mechanism and overlying transverse beater mechanism disposed adjacent the forward side of the transverse auger and cooperative with the elevating mechanism for moving the detached ears rearwardly into the forward sides of the respective transverse augers; means supporting the row units and auger troughs on the combine for vertical movement in unison; and hydraulic units anchored on the combine for effecting vertical movement of the auger troughs and row units.

9. A corn harvester attachment for use with a combine in a field in which corn is planted in conventional parallel rows spaced uniformly apart, and the combine has a longitudinal mobile body with a forwardly opening crop inlet, a forward transverse axle structure and right- and left-hand forward traction wheels at opposite ends of the axle structure, said attachment comprising: a conveyor housing structure including a centrally located forwardly projecting conveyor housing section adapted at its rear end for connection to the combine and opening, when attached thereto, into the crop inlet, the housing structure further including a pair of outwardly projecting auger troughs extending from the forward end of the central housing forwardly of the respective wheels to outer ends; material conveyor means in the housing structure for moving material from the front to the rear of the central housing and a pair of transverse augers for moving materials inwardly in the troughs to the central housing; forwardly and downwardly projecting harvesting structure immediately adjacent to and rigid with the forward sides of the auger troughs and including a plurality of row harvesting units for detaching ears from the corn stalks of the respective rows and further including elevating mechanism and overlying transverse beater mechanism positioned adjacent the forward sides of the transverse augers and cooperative with the elevating mechanism for moving the detached ears rearwardly into the forward sides of the respective transverse augers; means supporting the row units on the combine for vertical movement; and hydraulic units anchored on the combine for effecting vertical movement of the row units.

10. The invention defined in claim 9 in which the housing structure is composed of wall paneling and the paneling has material opening means adjacent the junctures of the auger troughs with a closure panel therefor; and further characterized by means on the housing structure biasing the closure panels into closed position, but yieldable to open upon internal pressure within the housing structure.

References Cited by the Examiner
UNITED STATES PATENTS

| | | | |
|---|---|---|---|
| 2,536,147 | 1/51 | Andrews | 56—18 X |
| 2,700,858 | 2/55 | Bulfer | 56—18 |
| 2,705,961 | 4/55 | Worrell et al. | 198—217 X |
| 2,794,307 | 6/57 | Morrison et al. | 56—18 |
| 2,912,812 | 11/59 | Aasland | 56—18 |
| 3,070,939 | 1/63 | Schwartz | 56—18 |

T. GRAHAM CRAVER, *Primary Examiner.*

ANTONIO F. GUIDA, *Examiner.*